United States Patent
Nakamura et al.

(10) Patent No.: US 6,333,375 B1
(45) Date of Patent: Dec. 25, 2001

(54) RUBBER COMPOSITION

(75) Inventors: Masao Nakamura; Yukio Takagishi, both of Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 09/077,187

(22) PCT Filed: May 21, 1997

(86) PCT No.: PCT/JP96/03478

§ 371 Date: May 26, 1998

§ 102(e) Date: May 26, 1998

(87) PCT Pub. No.: WO97/19990

PCT Pub. Date: Jun. 5, 1997

(30) Foreign Application Priority Data

Nov. 28, 1995 (JP) .................................................... 7-332836

(51) Int. Cl.⁷ ........................................................ C08K 5/04
(52) U.S. Cl. .................... 524/394; 524/398; 524/399; 524/400
(58) Field of Search .................................. 524/394, 398, 524/399, 400

(56) References Cited

U.S. PATENT DOCUMENTS

| 4,357,432 | 11/1982 | Edwards | 523/351 |
| 4,927,887 | * 5/1990 | Tate et al. | 525/279 |
| 5,496,883 | 3/1996 | Hamada | 524/492 |
| 5,665,799 | * 9/1997 | Inui et al. | 524/87 |

FOREIGN PATENT DOCUMENTS

| 0599643 | 6/1994 | (EP) . |
| 64 22940 | 1/1989 | (JP) . |
| 01101344 | 4/1989 | (JP) . |
| 01115904 | 5/1989 | (JP) . |
| 01188501 | 7/1989 | (JP) . |
| 03252431 | 11/1991 | (JP) . |
| 03252433 | 11/1991 | (JP) . |
| 05230286 | 9/1993 | (JP) . |
| 06212021 | * 8/1994 | (JP) . |
| 06248114 | * 9/1994 | (JP) . |

* cited by examiner

Primary Examiner—Peter D. Mulcahy

(57) ABSTRACT

The present invention provides a rubber composition comprising 100 parts by weight of a diene rubber component, 10 to 200 parts by weight of a reinforcing agent, and 0.1 to 15 parts by weight of a fatty acid salt. For example, the diene rubber preferably comprises a diene rubber having a heteroatom-containing polar group, the reinforcing agent preferably comprises carbon black or silica, and the fatty acid salt preferably comprises a metal salt of a $C_5$ to $C_{36}$ fatty acid. This rubber composition yields a vulcanized rubber showing improvements in heat build-up, tensile strength, abrasion resistance and processability.

21 Claims, No Drawings

RUBBER COMPOSITION

TECHNICAL FIELD

This invention relates to rubber compositions which yield vulcanized rubbers showing improvements in heat build-up, tensile strength, abrasion resistance and processability.

BACKGROUND ART

In recent years, as growing importance is attached to resource saving and environmental protection, the demand for a reduction in the fuel consumption of automobiles has become increasingly stronger. Also for automobile tires, it is desired to reduce their rolling resistance and thereby contribute to a reduction in fuel consumption. In order to reduce the rolling resistance of tires, it is common practice to use, as the rubber material for tires, a rubber material which can yield a vulcanized rubber showing a low degree of heat build-up.

Conventionally, it has been proposed to reduce heat build-up by using, as the rubber material for tires, a rubber composition comprising a diene rubber into which, in place of carbon black, silica is incorporated as a reinforcing agent. However, as compared with carbon black-filled rubber compositions, such silica-filled rubber compositions have the disadvantage that they fail to achieve sufficient abrasion resistance and tensile strength. One of the causes therefor is believed to be that silica has a lower affinity for diene rubbers than carbon black and hence fails to exhibit a sufficient reinforcing effect.

Conventionally, a method for enhancing the affinity of silica for diene rubbers by using a silane coupling agent has been proposed (Japanese Patent Laid-Open No. 252431/'91. Japanese Patent Laid-Open No. 252433/'91, etc.). However, in order to achieve a satisfactory effect, this method requires the use of a large amount of an expensive silane coupling agent.

As another improvement, the use of a diene rubber into which a substituent group having an affinity for silica has been introduced is being investigated. For example, diene rubbers having a tertiary amino group introduced thereinto (Japanese Patent Laid-Open No. 101344/'89) have been proposed for diene rubbers formed by emulsion polymerization; and diene rubbers having introduced thereinto an alkylsilyl group (Japanese Patent Laid-Open No. 188501/'89), a halogenated silyl group (Japanese Patent Laid-Open No. 230286/'93) or a substituted amino group (Japanese Patent Laid-Open No. 22940/'89) have been proposed for diene rubbers formed by anionic polymerization.

However, most of the diene rubbers having the aforesaid substituent groups introduced thereinto show poor processability because, when they are mixed with silica, they cohere strongly with silica and cannot be dispersed satisfactorily. Moreover, they also have the disadvantage that their properties such as heat build-up, tensile strength and abrasion resistance are not fully improved.

An object of the present invention is to provide a rubber composition containing a diene rubber component and a reinforcing agent, and capable of yielding a vulcanized rubber which shows a low degree of heat build-up, exhibits excellent tensile strength and abrasion resistance, and has good processability.

DISCLOSURE OF INVENTION

The present inventors have made intensive investigations with a view to overcoming the above-describe problems of the prior art. As a result, it has now been discovered that a composition obtained by incorporating a fatty acid salt (e.g., calcium stearate) into a mixture of a diene rubber and a reinforcing agent can yield a vulcanized rubber showing improvements in heat build-up, tensile strength, abrasion resistance and processability. The present invention has been completed on the basis of this discovery.

Thus, the present invention provides a rubber composition comprising 100 parts by weight of a diene rubber component, 10 to 200 parts by weight of a reinforcing agent, and 0.1 to 15 parts by weight of a fatty acid salt.

Diene Rubber Component

No particular limitation is placed on the type of the diene rubber component used in the present invention, provided that it is a rubber-like polymer formed chiefly from a conjugated diene. Specific examples thereof include natural rubber (NR), polyisoprene rubber (IR), emulsion-polymerized styrene-butadiene copolymer rubber (SBR), solution-polymerized random SBR (containing 5 to 50% by weight of bound styrene and having a 1,2-linkage content of 10 to 80% in the portions consisting of combined butadiene units), high-trans SBR (having a trans-form content of 70 to 95% in the portions consisting of combined butadiene units), low-cis polybutadiene rubber (BR), high-cis BR, high-trans BR (having a trans-form content of 70 to 95% in the portions consisting of combined butadiene units), styrene-isoprene copolymer rubber (SIR), butadiene-isoprene copolymer rubber, solution-polymerized random styrene-butadiene-isoprene copolymer rubber (SIBR), emulsion-polymerized SIBR, high-vinyl SBR/low-vinyl SBR block copolymer rubber, and block copolymers such as polystyrene-polybutadiene-polystyrene block copolymers. Among them, NR, BR, IR, SBR and SIBR are preferred. From the viewpoint of processability, NR and IR are particularly preferred.

Diene Rubbers Having a Heteroatom-containing Polar Group

In the present invention, it is preferable to use, as the diene rubber component, a diene rubber having a heteroatom-containing polar group or a combination of a diene rubber having a heteroatom-containing polar group and another diene rubber, because they can give a highly balanced combination of properties such as heat build-up, tensile strength, abrasion resistance and processability.

The term "heteroatom" as used herein means an atom of an element belonging to the second to fourth periods of the period table and to group VB or VIB thereof. Specific examples thereof include nitrogen, oxygen, sulfur and phosphorus atoms. Among them, nitrogen and oxygen atoms are preferred.

Polar groups containing such a heteroatom include, for example, hydroxyl, oxy, epoxy, carboxyl, carbonyl, oxycarbonyl, sulfide, disulfide, sulfonyl, sulfinyl, thiocarbonyl, imino, amino, nitrile, ammonium, imido, amido, hydrazo, azo and diazo groups. Among them, hydroxyl, oxy, epoxy, sulfide, disulfide, imino and amino groups are preferred; hydroxyl, amino and oxy groups are more preferred; and hydroxyl and amino groups are most preferred.

No particular limitation is placed on the type of the diene rubber having a heteroatom-containing polar group, provided that it is a diene rubber having, in the molecule, at least one polar group as described above. Specifically, the diene rubber having a heteroatom-containing polar group may comprise, for example, (1) a polar group-containing diene rubber such as a copolymer formed from a vinyl monomer having a heteroatom-containing polar group and a conjugated diene, or a copolymer formed from a vinyl monomer having a heteroatom-containing polar group, a conjugated diene and an aromatic vinyl, or (2) a polar group-containing diene rubber obtained by providing a polymer of a conjugated diene which has a combined active metal in the molecule or a copolymer of a conjugated diene and an aromatic vinyl which has a combined active metal in the molecule, and reacting the (co)polymer with a modifying agent to introduce a heteroatom-containing polar group into the (co)polymer.

In the above-described diene rubber (1) having a heteroatom-containing polar group which is formed by copolymerization, the contents of various monomers may be suitably chosen according to the intended purpose. In the case of a copolymer formed from a vinyl monomer having a heteroatom-containing polar group and a conjugated diene, the content of combined vinyl monomer units having a heteroatom-containing polar group is usually in the range of 0.01 to 20% by weight, preferably 0.05 to 15% by weight, and more preferably 0.1 to 10% by weight; and the content of combined conjugated diene units is usually in the range of 80 to 99.99% by weight, preferably 85 to 99.95% by weight, and more preferably 90 to 99.9% by weight. In order to achieve a highly balanced combination of heat build-up and wet skid resistance, it is especially preferable to use a copolymer formed from a vinyl monomer having a heteroatom-containing polar group, a conjugated diene and an aromatic vinyl. In such a case, the content of combined vinyl monomer units having a heteroatom-containing polar group is usually in the range of 0.01 to 20% by weight, preferably 0.05 to 15% by weight, and more preferably 0.1 to 10% by weight; the content of combined conjugated diene units is usually in the range of 40 to 94.99% by weight, preferably 50 to 85% by weight, and more preferably 55 to 80% by weight; and the content of combined aromatic vinyl units is usually in the range of 5 to 55% by weight, preferably 10 to 45% by weight, and more preferably 15 to 40% by weight.

In the above-described polar group-containing diene rubber (2) obtained by introducing a heteroatom-containing polar group according to the modification method, the contents of various monomers may be suitably chosen according to the desired properties. Specifically, the content of combined conjugated diene units is usually in the range of 40 to 100% by weight, preferably 50 to 90% by weight, and more preferably 60 to 85% by weight; and the content of combined aromatic vinyl units is usually in the range of 0 to 60% by weight, preferably 10 to 50% by weight, and more preferably 15 to 40% by weight.

Examples of the conjugated diene include 1,3-butadiene, 2-methyl-1,3-butadiene, 2,3-dimethyl-1,3-butadiene, 2-chloro-1,3-butadiene and 1,3-pentadiene. Among them, 1,3-butadiene and 2-methyl-1,3-butadiene are preferred, and 1,3-butadiene is more preferred. These conjugated dienes may be used alone or in admixture of two or more.

As the aromatic vinyl, an aromatic vinyl compound not having the above-described polar group is used. Examples thereof include styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene. Among them, styrene is preferred. These aromatic vinyls may be used alone or in admixture of two or more.

No particular limitation is placed on the type of the vinyl monomer having a heteroatom-containing polar group, provided that it is a polymerizable monomer has at least one polar group in the molecule. Specific examples thereof include amino-containing vinyl monomers, hydroxyl-containing vinyl monomers and oxy-containing vinyl monomers. Among them, hydroxyl-containing vinyl monomers and amino-containing vinyl monomers are preferred. These vinyl monomers having a heteroatom-containing polar group may be used alone or in admixture of two or more.

The amino-containing vinyl monomers are polymerizable monomers having, in the molecule, at least one amino group selected from primary, secondary and tertiary amino groups. Among them, tertiary amino-containing vinyl monomers are particularly preferred.

Examples of the primary amino-containing vinyl monomers include acrylamide, methacrylamide, p-aminostyrene, aminomethyl (meth)acrylate, aminoethyl (meth)acrylate, aminopropyl (meth)acrylate and aminobutyl (meth)acrylate.

Examples of the secondary amino-containing vinyl monomers include anilinostyrenes as disclosed in Japanese Patent Laid-Open No. 130355/'86: anilinophenylbutadienes as disclosed in Japanese Patent Laid-Open No. 130356/'86; and N-monosubstituted (meth)acrylamides such as N-methyl (meth)acrylamide, N-ethyl(meth)acrylamide, N-methylolacrylamide and N-(4-anilinophenyl) methacrylamide.

Examples of the tertiary amino-containing vinyl monomers include N,N-disubstituted aminoalkyl acrylates, N,N-disubstituted aminoalkylacrylamides, N,N-disubstituted amino aromatic vinyl compounds and pyridyl-containing vinyl compounds.

Examples of the N,N-disubstituted amino acrylates include acrylic or methacrylic esters such as N,N-dimethylaminomethyl (meth)acrylate, N,N-dimethylaminoethyl (meth)acrylate, N,N-dimethylaminopropyl (meth)acrylate, N,N-dimethylaminobutyl (meth)acrylate, N,N-diethylaminoethyl (meth)acrylate, N,N-diethylaminopropyl (meth)acrylate, N,N-diethylaminobutyl (meth)acrylate, N-methyl-N-ethylaminoethyl (meth)acrylate, N,N-dipropylaminoethyl (meth)acrylate, N,N-dibutylaminoethyl (meth)acrylate, N,N-dibutylaminopropyl (meth)acrylate, N,N-dibutylaminobutyl (meth)acrylate, N,N-dihexylaminoethyl (meth)acrylate, N,N-dioctylaminoethyl (meth)acrylate and acryloylmorpholine. Among them, N,N-dimethylaminoethyl (meth)acrylate, N,N-diethylaminoethyl (meth)acrylate, N,N-dipropylaminoethyl (meth)acrylate, N,N-dioctylaminoethyl (meth)acrylate and N-methyl-N-ethylaminoethyl (meth)acrylate are preferred.

Examples of the N,N-disubstituted aminoalkyl acrylamides include acrylamide or methacrylamide compounds such as N,N-dimethylaminomethyl (meth)acrylamide, N,N-dimethylaminoethyl (meth)acrylamide, N,N-dimethylaminopropyl (meth)acrylamide, N,N-dimethylaminobutyl (meth)acrylamide, N,N-diethylaminoethyl (meth)acrylamide, N,N-diethylaminopropyl (meth)acrylamide, N,N-diethylaminobutyl (meth)acrylamide, N-methyl-N-ethylaminoethyl (meth)acrylamide, N,N-dipropylaminoethyl(meth)acrylamide, N,N-dibutylaminoethyl (meth)acrylamide, N,N-dibutylaminopropyl (meth)acrylamide, N,N-dibutylaminobutyl (meth)acrylamide, N,N-dihexylaminoethyl (meth) acrylamide, N,N-dihexylaminopropyl (meth)acrylamide and N,N-dioctylaminopropyl (meth)acrylamide. Among them, N,N-dimethylaminopropyl (meth)acrylamide, N,N-diethylaminopropyl (meth)acrylamide and N,N-dioctylaminopropyl (meth)acrylamide are preferred.

Examples of the N,N-disubstituted amino aromatic vinyl compounds include styrene derivatives such as N,N-dimethylaminoethylstyrene, N,N-diethylaminoethylstyrene, N,N-dipropylaminoethylstyrene and N,N-dioctylaminoethylstyrene.

Examples of the pyridyl-containing vinyl compounds include 2-vinylpyridine, 4-vinylpyridine, 5-methyl-2-vinylpyridine and 5-ethyl-2-vinylpyridine. Among them, 2-vinylpyridine and 4-vinylpyridine are preferred.

The hydroxyl-containing vinyl monomers are polymerizable monomers having at least one primary, secondary or tertiary hydroxyl group in the molecule. These hydroxyl-containing vinyl monomers include, for example, hydroxyl-containing unsaturated carboxylic acid monomers, hydroxyl-containing vinyl ether monomer and hydroxyl-containing vinyl ketone monomers. Among them, hydroxyl-containing unsaturated carboxylic acid monomers are preferred. Examples of the hydroxyl-containing unsaturated carboxylic acid monomers include derivatives (e.g., esters, amides and anhydrides) of acrylic acid, methacrylic acid, itaconic acid, fumaric acid and maleic acid. Among them, ester compounds of acrylic acid and methacrylic acid are preferred.

Specific examples of the hydroxyl-containing vinyl monomers include hydroxymethyl (meth)acrylate, 2-hydroxyethyl (meth)acrylate, 2-hydroxypropyl (meth)acrylate, 3-hydroxypropyl (meth)acrylate, 3-chloro-2-hydroxypropyl (meth)acrylate, 3-phenoxy-2-hydroxypropyl (meth)acrylate, glycerol mono(meth)acrylate, hydroxybutyl (meth)acrylate, 2-chloro-3-hydroxypropyl (meth)-acrylate, hydroxyhexyl (meth)acrylate, hydroxyoctyl (meth)acrylate, hydroxymethyl(meth)acrylamide, 2-hydroxypropyl (meth) acrylamide, 3-hydroxypropyl (meth)acrylamide, di(ethylene glycol) itaconate, di(propylene glycol) itaconate, bis(2-hydroxypropyl) itaconate, bis(2-hydroxyethyl) itaconate, bis (2-hydroxyethyl) fumarate, bis(2-hydroxyethyl) maleate, 2-hydroxyethyl vinyl ether, hydroxymethyl vinyl ketone and allyl alcohol. Among them, hydroxymethyl (meth)acrylate, 2-hydroxyethyl (meth)acrylate, 2-hydroxypropyl (meth) acrylate, 3-hydroxypropyl (meth)acrylate, 3-phenoxy-2-hydroxypropyl (meth)acrylate, glycerol mono(meth) acrylate, hydroxybutyl (meth)acrylate, hydroxyhexyl (meth) acrylate, hydroxyoctyl (meth)acrylate, hydroxymethyl (meth)acrylamide, 2-hydroxypropyl(meth)acrylamide and 3-hydroxypropyl (meth)acrylamide are preferred.

Examples of the oxy-containing vinyl monomers include the alkoxysilyl-containing vinyl monomers disclosed in Japanese Patent Laid-Open No. 188356/'95, such as trimethoxyvinylsilane, triethoxyvinylsi lane, 6-trimethoxysilyl-1,2-hexene, p-trimethoxysilylstyrene, 3-trimethoxysilylpropyl methacrylate and 3-triethoxysilylpropyl acrylate.

These vinyl monomers having a heteroatom-containing polar group may be used alone or in admixture of two or more.

Although no particular limitation is placed on the process for preparing a diene rubber having a heteroatom-containing polar group according to the copolymerization method described in (1) above, emulsion polymerization is usually employed. For purposes of emulsion polymerization, any common emulsion polymerization process may be employed. One example thereof comprises emulsifying or dispersing specified amounts of the aforesaid monomers in an aqueous medium in the presence of an emulsifying agent and then effecting emulsion polymerization with the aid of a radical polymerization initiator.

As the emulsifying agent, there may be used, for example, a long-chain fatty acid salt of 10 or more carbon atoms and/or a rosinate. Specific examples thereof include potassium and sodium salts of capric acid, lauric acid, myristic acid, palmitic acid, oleic acid and stearic acid.

Examples of the radical polymerization initiator include persulfuric acid salts such as ammonium persulfate and potassium persulfate; and redox initiators such as a combination of ammonium persulfate and ferric sulfate, a combination of an organic peroxide and ferric sulfate, and a combination of hydrogen peroxide and ferric sulfate.

Moreover, a chain transfer agent may be added in order to regulate the molecular weight of the copolymer. Usable chain transfer agents include, for example, mercaptans such as t-dodecyl mercaptan and n-dodecyl mercaptan, carbon tetrachloride, thioglycollic acid, diterpene, α-methylstyrene dimer, terpinolene and γ-terpinenes.

The temperature for emulsion polymerization may be suitably chosen according to the type of the radical polymerization initiator used. However, it is usually in the range of 0 to 100° C. and preferably 0 to 60° C. The manner of polymerization may be either continuous polymerization or batch polymerization.

As the degree of conversion in emulsion polymerization becomes higher, the polymerization mixture tends to undergo gelation. Consequently, the degree of conversion is preferably controlled so as to be not greater than 90%. It is especially preferable to stop the polymerization at a degree of conversion in the range of 50 to 80%. The polymerization reaction is usually stopped by adding a polymerization stopper to the polymerization system when a predetermined degree of conversion is reached. Usable polymerization stoppers include, for example, amine compounds such as diethylhydroxylamine and hydroxylamine, and quinone compounds such as hydroquinone and benzoquinone, as well as sodium nitrite and sodium dithiocarbamate.

After the emulsion polymerization reaction is stopped, unreacted monomers are removed from the resulting polymer latex as required, and the pH of the latex is adjusted to a predetermined value as required by the addition of an acid such as nitric acid or sulfuric acid. Thereafter, a coagulant comprising a salt such as sodium chloride, calcium chloride or potassium chloride is added to and mixed with the latex to coagulate the polymer in the form of crumbs. These crumbs are washed, dehydrated and then dried with a band dryer or the like. Thus, the desired polar group-containing diene rubber can be obtained.

In order to prepare a diene rubber having a heteroatom-containing polar group according to the modification method described in (2) above, a diene rubber having a combined active metal in the molecular chain is first prepared. Then, a heteroatom-containing polar group is introduced into this diene rubber by reacting it with a modifying agent.

No particular limitation is placed on the type of the active metal. For example, metals capable of anionic polymerization may be used. Specifically, they include, for example, alkali metals such as lithium, sodium, potassium, rubidium and cesium, which are described in Japanese Patent Laid-Open No. 162604/'83, Japanese Patent Laid-Open No. 42552/'86, Japanese Patent Publication No. 30841/'93, Japanese Patent Laid-Open No. 297403/'88 and the like; alkaline earth metals such as beryllium, magnesium, calcium, strontium and barium; and lanthanoid series rare earth metals such as lanthanum and neodymium. Among them, alkali metals and alkaline earth metals are preferred, and alkali metals are particularly preferred.

The diene rubber having a combined active metal may be prepared by polymerizing a conjugated diene, or a conjugated diene and an aromatic vinyl, according to a solution polymerization process using an active metal-based catalyst as the initiator (Japanese Patent Laid-Open No. 162604/'83). An alternative method is to prepare a diene rubber according to any of various polymerization techniques (such as emulsion polymerization and solution polymerization) and subsequently add an active metal to the diene rubber chain (Japanese Patent Laid-Open No. 189203/'83). However, the present invention is not limited to these methods.

As the active metal-based catalyst (or active metal-containing initiator), there may be used an organic alkali metal catalyst, an organic alkaline earth metal catalyst, an organic acid lanthanoid series rare earth metal catalyst or the like. Among them, an organic alkali metal catalyst is preferred.

Examples of the organic alkali metal catalyst include mono-organolithium compounds such as n-butyllithium, sec-butyllithium, t-butyllithium, hexyllithium, phenyllithium and stilbene lithium; multifunctional organolithium compounds such as dilithiomethane, 1,4-dilithiobutane, 1,4-dilithio-2-ethylcyclohexane and 1,3,5-trilithiobenzene; tertiary amino-containing organolithium compounds as disclosed in Japanese Patent Laid-Open No. 2916/'95 and Japanese Patent Laid-Open No. 53616/'95; and sodium naphthalene and potassium naphthalene. Among them, organolithium compounds are preferred and mono-organolithium compounds are particularly preferred.

Examples of the organic alkaline earth metal catalyst include n-butylmagnesium bromide, n-hexylmagnesium bromide, ethoxycalcium, calcium stearate, t-butoxystrontium, ethoxybarium, isopropoxybarium, phenoxybarium, diethylaminobarium, barium stearate and ethylbarium.

Examples of the organic acid lanthanoid series rare earth metal catalyst include a complex catalyst composed of neodymium versaticate/triethylaluminum hydride/ethylaluminum sesquichloride as described in Japanese Patent Publication No. 64444/'88.

These active metal-containing initiators may be used alone or in admixture of two or more. In the case of solution polymerization (anionic polymerization), the amount of active metal-containing initiator used may be suitably chosen according to the type of the initiator or the desired molecular weight of the formed polymer. It is usually in the range of 1 to 20 millimoles, preferably 2 to 15 millimoles and more preferably 3 to 10 millimoles per kilogram of the formed diene rubber.

Anionic polymerization using an initiator as described above is carried out in a hydrocarbon solvent which does not destroy the initiator. No particular limitation is placed on the type of the hydrocarbon solvent, and there may be employed any hydrocarbon solvent that is commonly used for purposes of anionic polymerization. It may be selected from well-known hydrocarbon solvents including, for example, aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene and toluene. Among them, N-hexane, cyclohexane and toluene are preferred. Moreover, unsaturated hydrocarbons having low polymerizability, such as 1-butene, cis-2-butene and 2-hexene, may be used as required. These hydrocarbon solvents may be used alone or in admixture of two or more. The amount of hydrocarbon solvent used is usually such that the monomer concentration is in the range of 1 to 30% by weight.

In the anionic polymerization reaction, a microstructure regulator may be added for the purpose of regulating the microstructure of the combined conjugated diene units or the distribution of the aromatic vinyl copolymerized with the conjugated diene in the copolymer chain. Examples of the microstructure regulator include ethers such as tetrahydrofuran, diethyl ether, dioxane, ethylene glycol dimethyl ether, ethylene glycol dibutyl ether, diethylene glycol dimethyl ether and diethylene glycol dibutyl ether; tertiary amine compounds such as tetramethylethylenediamine, trimethylamine, triethylamine, pyridine and quinuclidine; alkali metal alkoxide compounds such as potassium t-pentoxide and potassium t-butoxide; and phosphine compounds such as triphenylphosphine. These microstructure regulators may be used alone or in admixture of two or more. The amount of microstructure regulator used is usually in the range of 0 to 200 moles per mole of the initiator.

According to any desired polymerization process such as batch or continuous process, the anionic polymerization reaction is usually carried out at a temperature in the range of −78 to 150° C. Where an aromatic vinyl is copolymerized, in order to improve the random arrangement of aromatic vinyl units, it is desirable to feed the conjugated diene or a mixture of the conjugated diene and the aromatic vinyl continuously or intermittently to the reaction system so that the proportion of the aromatic vinyl relative to the combined amount of the aromatic vinyl and the conjugated diene present in the polymerization system is within a specific range, as described, for example, in Japanese Patent Laid-Open No. 140211/'84 and Japanese Patent Laid-Open No. 143209/'81.

Specific examples of the polymer formed by the anionic polymerization include polybutadiene, polyisoprene, butadiene-isoprene copolymers, styrene-butadiene copolymers, styrene-isoprene copolymers and styrene-butadiene-isoprene copolymers. Thus, there is obtained a conjugated diene polymer having an active metal attached to an end of the polymer chain (hereinafter referred to as the active polymer).

According to the method in which the addition of an active metal is effected by an after-reaction (i.e., the after-addition reaction of an active metal), the polymerization reaction is stopped, for example, by adding an equimolar amount of an alcohol (e.g., methanol or isopropanol) to the aforesaid active polymer. Thereafter, an active metal-containing initiator and, if necessary, the aforesaid microstructure regulator are newly added and reacted to introduce the active metal. The reaction temperature is usually in the range of −78 to 150° C. and preferably 20 to 100° C., and the reaction time is usually in the range of 0.1 to 24 hours and preferably 0.5 to 4 hours. Thus, there is obtained an active polymer having a combined active metal in the main polymer chain. Similarly, a conjugated diene polymer obtained by another polymerization technique such as emulsion polymerization may be reacted with an active metal-containing initiator to introduce the active metal into the molecular chain.

No particular limitation is placed on the type of the modifying agent, provided that it can react with the aforesaid active metal to form a polar group as described previously. For example, various modifying agents disclosed in Japanese Patent Laid-Open No. 191705/'84, Japanese Patent Laid-Open No. 137913/'85, Japanese Patent Laid-Open No. 86074/'87, Japanese Patent Laid-Open No. 109801/'87, Japanese Patent Laid-Open No. 149708/'84, Japanese Patent Laid-Open No. 22940/'89 and the like. Specifically, they include, for example, compounds having, in the molecule, at least one substituent selected from carbonyl, thiocarbonyl, amino, aziridine and epoxy groups. Moreover, compounds having, in the molecule, both a functional group capable of reacting with the active metal and a polar group as described previously. In such compounds, the functional group capable of reacting with the active metal may be, for example, a carbon-carbon unsaturated group (e.g., vinyl), a halogen atom or a carbonyl group.

Specific examples of the modifying agent include ketones such as acetone, benzophenone and acetylacetone; esters such as methyl acetate, methyl adipate, methyl methacrylate and ethyl methacrylate; aldehydes such as benzaldehyde; epoxies; epihalohydrins; carbodiimides; Schiff bases such as N-ethylethylideneimine, N-methylbenzylideneimine, N-hexylcinnamylideneimine, N-decyl-2-ethyl-1,2-diphenylbutylideneimine, N-phenylbenzylideneimine, N-dodecylcyclohexaneimine, N-propyl-2,5-cyclohexanedieneimine and N-methyl-1-naphthaleneimine; cyclic imine compounds having 2 or 3 carbon atoms; compounds having vinyl and hydroxyl groups in the molecule; compounds having vinyl and amino groups in the molecule; compounds having vinyl and alkoxysilyl groups in the molecule; compounds having a halogen atom and an alkoxysilyl group in the molecule; and compounds having carbonyl and amino groups in the molecule. Among them, epoxies, epihalohydrins, carbodiimides, cyclic imine compounds having 2 or 3 carbon atoms, compounds having vinyl and hydroxyl groups in the molecule, compounds having vinyl and amino groups in the molecule, compounds having vinyl and alkoxysilyl groups in the molecule, compounds having a halogen atom and an alkoxysilyl group in the molecule, and compounds having carbonyl and amino groups in the molecule are preferred in order to achieve a more highly balanced combination of heat build-up characteristics and abrasion resistance, and compounds having carbonyl and amino groups in the molecule are particularly preferred.

Examples of the epoxies include ethylene oxide, propylene oxide, 1,2-epoxybutane, 1,2-epoxyisobutane, 2,3-epoxybutane, 1.2-epoxyhexane, 1,2-epoxyoctane, 1,2-epoxydecane, 1,2-epoxytetradecane, 1,2-epoxyhexadecane, 1,2-epoxyoctadecane, 1,2-epoxyeicosane, 1,2-epoxy-2-pentylpropane, 3,4-epoxy-1-butene, 1,2-epoxy-5-hexene, 1,2-epoxy-9-decene, 1,2-epoxycyclopenane, 1.2-epoxycyclohexane, 1,2-epoxycyclododecane, 1,2-poxyethylbenzene, 1,2-epoxy-1-methoxy-2-methylpropane, glycidyl methyl ether, glycidyl ethyl ether, glycidyl isopropyl ether, glycidyl allyl ether, glycidyl phenyl ether, glycidyl butyl ether, 2-(3,4-epoxycyclohexyl)-ethyltrimethoxysilane and 3-glycidyloxypropyltrimethoxysilane. Among them, ethylene oxide, propylene oxide, 1,2-epoxybutane, 1,2-epoxyisobutane, 2,3-epoxybutane, 1,2-epoxyhexane, 3,4-epoxy-1-butene, 1,2-epoxy-5-hexene, glycidyl methyl ether, glycidyl ethyl ether, glycidyl isopropyl ether, glycidyl allyl ether, glycidyl phenyl ether, glycidyl butyl ether and 3-glycidyloxypropyltrimethoxysilane are preferred.

Examples of the epihalohydrins are the compounds derived from the aforesaid epoxies by replacing at least one hydrogen atom with a halogen atom. The preferred range thereof is the same as for the aforesaid epoxies. Specific examples thereof include epichlorohydrin, epibromohydrin, epiiodohydrin, 2,3-epoxy-1,1,1-trifluoropropane and 1,2-epoxy-1H, 1H, 2H, 3H, 3H-heptadecafluoroundecane. Among them, epichlorohydrin and epibromohydrin are preferred.

Examples of the carbodiimides include dimethylcarbodiimide, diethylcarbodiimide, dipropylcarbodiimide, dibutylcarbodiimide, dihexylcarbodiimide, dicyclohexylcarbodiimide, dibenzylcarbodiimide, diphenylcarbodiimide, methylpropylcarbodiimide, butylcyclohexylcarbodiimide, ethylbenzylcarbodiimide, propylphenylcarbodiimide and phenylbenzylcarbodiimide. Among them, dicyclohexylcarbodiimide and diphenylcarbodiimide are preferred.

Examples of the cyclic imine compounds having 2 or 3 carbon atoms include N-unsubstituted aziridine compounds such as ethyleneimine and propyleneimine; and N-unsubstituted azetidine compounds such as trimethyleneimine.

As examples of the compounds having a vinyl group and a hydroxyl or amino group in the molecule, there may be used compounds such as the aforesaid hydroxyl-containing vinyl monomers and amino-containing vinyl monomers.

Examples of the compounds having a vinyl group or a halogen atom and an alkoxysilyl group in the molecule are those disclosed in Japanese Patent Laid-Open No. 188501/'89. Specifically, they include monovinylsilane compounds such as trimethoxyvinylsilane, triethoxyvinylsilane, triphenoxyvinylsilane and tri (2-methylbutoxy)vinylsilane; and monohalogenated alkoxysilane compounds such as trimethoxychlorosilane, triethoxychlorosilane, diethoxymethylchlorosilane, triphenoxychlorosilane and diphenoxyphenyliodosilane. These compounds may be used alone or in admixture of two or more. However, the amount of the compound added must be determined so that the amount of the functional group (i.e., the vinyl group or the halogen atom) is equal to or greater than the equivalent amount for the active metal.

In the compounds having carbonyl and amino groups in the molecule, both groups may be adjacent to each other or separated from each other. Examples of the compound in which both groups are adjacent to each other include amides, imides, ureas and isocyanuric acids. Such compounds of cyclic form are preferred, and N-substituted cyclic amides and N-substituted cyclic ureas are more preferred. Examples of the compound in which both groups are separated from each other include aminoketones and aminoaldehydes. N-substituted aminoketones and N-substituted aminoaldehydes are preferred, and N-substituted aminoketones are more preferred.

Examples of the N-substituted cyclic amides include N-methyl-β-propiolactam, N-phenyl-β-propiolactam, N-methyl-2-pyrrolidone, N-vinyl-2-pyrrolidone, N-phenyl-2-pyrrolidone, N-t-butyl-2-pyrrolidone, N-methyl-5-methyl-2-pyrrolidone, N-methyl-2-piperidone, N-vinyl-2-piperidone, N-phenyl-2-piperidone, N-methyl-ε-caprolactam, N-phenyl-ε-caprolactam, N-methyl-ω-laurolactam and N-vinyl-ω-laurolactam. Among them, N-methyl-2-pyrrolidone, N-vinyl-2-pyrrolidone, N-phenyl-2-pyrolidone, N-methyl-2-piperidone, N-vinyl-2-piperidone, N-methyl-ε-caprolactam and N-phenyl-ε-caprolactam are preferred.

Examples of the N-substituted cyclic ureas include 1,3-dimethylethyleneurea, 1,3-divinylethylene-urea, 1,3-diethyl-2-imidazolidinone and 1-methyl-3-ethyl-2-imidazolidinone. Among them, 1,3-dimethylethyl-eneurea and 1,3-divinylethyleneurea are preferred.

Examples of the N-substituted aminoketones include 4-N,N-dimethylaminoacetophenone, 4-N,N-diethyl-aminoacetophenone, 1,3-bis(diphenylamino)-2-propanone, 1,7-bis(methylethylamino)-4-heptanone, 4-N,N-dimethyl-aminobenzophenone, 4-N,N-di-t-butylaminobenzophenone, 4-N,N-diphenylaminobenzophenone, 4,4'-bis (dimethylamino)benzophenone, 4,4'-bis(diethylamino) benzophenone and 4,4'-bis(diphenylamino)benzophenone. Among them, 4,4'-bis(dimethylamino)benzophenone, 4,4'-bis(diethylamino)-benzophenone and 4,4'-bis (diphenylamino)benzophenone are particularly preferred.

Examples of the N-substituted aminoaldehydes include N-substituted aminoaldehydes such as 4-N,N-dimethylaminobenzaldehyde, 4-N,N-diphenylaminobenzaldehyde and 4-N,N-divinylaminobenzaldehyde.

These modifying agents may be used alone or in admixture of two or more. The amount of modifying agent used may be suitably chosen according to the type of the modifying agent used and the desired properties. However, it is usually used in the range of 0.1 to 50 equivalents, preferably 0.2 to 20 equivalents, and more preferably 0.3 to 10 equivalents.

The modification reaction may be effected by bringing the aforesaid active polymer having a combined active metal in the molecule into contact with a modifying agent. When the active polymer is prepared by anionic polymerization, the modification reaction is usually carried out by adding a specified amount of a modifying agent to the active polymer solution before stopping the polymerization. Alternatively, it is also possible to introduce an active metal into both an end and the main chain of the polymer and then react the resulting active polymer with a modifying agent. In the modification reaction, the reaction temperature and the reaction time may be chosen in wide ranges. Generally, the reaction temperature may range from room temperature to 120° C. and the reaction time may range from several seconds to several hours.

Where the modification reaction is carried out by anionic polymerization as described above, it is possible to regulate the microstructure of the combined conjugated diene units in the polar group-containing diene rubber obtained by the modification reaction. Although no particular limitation is placed on the proportion of vinyl linkages (i.e., 1,2-vinyl and 3,4-vinyl linkages) in the combined conjugated diene units, it is usually regulated so as to be in the range of 5 to 95%, preferably 20 to 90%, more preferably 30 to 85%, and most preferably 40 to 80%. When the proportion of vinyl linkages in the combined conjugated diene units is within this range, a highly balanced combination of properties such as tensile strength and abrasion resistance is achieved.

These diene rubbers (i.e., diene rubbers having a heteroatom-containing polar group and other diene rubbers) may be used alone or in admixture of two or more. When such a polar group-containing diene rubber (A) and one or more other diene rubbers (B) are used in admixture, their mixing ratio may be suitably chosen according to the intended application and purpose. However, the weight ratio of (A) to (B) is usually in the range of 10:90 to 90:10, preferably 15:85 to 85:15, and more preferably 20:80 to 80:20. In such cases, the composition of the diene rubber component is as follows. For example, when [the polar group-containing diene rubber (A)] and [NR and/or IR] are used in admixture, their weight ratio is preferably in the range of 20:80 to 80:20 and more preferably 30:70 to 70:30. For example, when [the polar group-containing diene rubber (A)], [NR and/or IR] and [SBR] are used in admixture, their weight ratio is preferably in the range of 80–20:10–70:10:70.

No particular limitation is placed on the Mooney viscosity ($ML_{1+4}$, 100° C.) of the diene rubber component used in the present invention. However, it is usually in the range of 10 to 250, preferably 20 to 150, and more preferably 25 to 120. When the Mooney viscosity is within this range, a highly balanced combination of properties such as heat build-up, abrasion resistance and processability is preferably achieved. The Mooney viscosity ($ML_{1+4}$, 100° C.) of the diene rubber component may also be regulated so as to be within this range, by adding an oil or the like to form an oil-extended rubber.

Reinforcing Agent

No particular limitation is placed on the type of the reinforcing agent. For example, silica and carbon black may be used.

No particular limitation is placed on the type of silica. Examples thereof include dry process white carbon, wet process white carbon, colloidal silica, and precipitated silica as disclosed in Japanese Patent Laid-Open No. 62838/'87. Among them, wet process white carbon consisting essentially of hydrated silica is particularly preferred. These silicas may be used alone or in admixture of two or more.

No particular limitation is placed on the specific surface area of silica. However, the specific surface area of silica should usually be in the range of 50 to 400 $m^2/g$, preferably 100 to 250 $m^2/g$, and more preferably 120 to 190 $m^2/g$, as expressed in terms of a nitrogen adsorption specific surface area (measured by the BET method), because sufficient improvements in reinforcing power, abrasion resistance and heat build-up are achieved in such a case. The term "nitrogen adsorption specific surface area" as used herein refers to a value measured by the BET method according to ASTM D3037-81.

No particular limitation is placed on the type of carbon black. However, usable carbon blacks include furnace black, acetylene black, thermal black, channel black and graphite. Among them, furnace black is particularly preferred. Specific examples thereof include products of various grades such as SAF, ISAF, ISAF-HF, ISAF-LS, IISAF-HS, HAF, HAF-HS, HAF-LS and FEF. These carbon blacks may be used alone or in admixture of two or more.

No particular limitation is placed on the nitrogen adsorption specific surface area ($N_2SA$) of carbon black. However, when it is usually in the range of 5 to 200 $m^2/g$, preferably 50 to 150 $m^2/g$, and more preferably 80 to 130 $m^2/g$, tensile strength and abrasion resistance are. improved to a high degree. Moreover, no particular limitation is placed on the DBP adsorption level of carbon black. However, when it is usually in the range of 5 to 300 ml/100 g, preferably 50 to 200 ml/100 g, and more preferably 80 to 160 ml/100 g, tensile strength and abrasion resistance are improved to a high degree.

Abrasion resistance can further be improved by using high-structure carbon black which is disclosed in Japanese Patent Laid-Open No. 230290/'93 and characterized by a cetyltrimethylammonium bromide (CTAB) adsorption specific surface area of 110 to 170 $m^2/g$ and a DBP (24MD4BP) adsorption level of 110 to 130 ml/100 g after being repeatedly compressed four times under a pressure of 24,000 psi.

The amount of reinforcing agent used is in the range of 10 to 200 parts by weight, preferably 20 to 150 parts by weight, and more preferably 30 to 120 parts by weight, per 100 parts by weight of the rubber component.

In order to accomplish the objects of the present invention to the fullest extent, it is preferable to use, as the reinforcing agent, silica alone or a combination of silica and carbon black. When a combination of silica and carbon black is used, the mixing ratio thereof may be suitably chosen according to the intended application or purpose. However, the weight ratio of silica to carbon black is usually in the range of 10:90 to 99:1, preferably 30:70 to 95:5, and more preferably 50:50 to 90:10.

Silane Coupling Agent

In the present invention, the addition of a silane coupling agent is preferable because this brings about further improvements in heat build-up and abrasion resistance.

No particular limitation is placed on the type of the silane coupling agent. Examples thereof include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-β-(aminoethyl)-γ-aminopropyltrimethoxysilane, N-β-(aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane and bis[3-(triethoxysilyl)propyl] tetrasulfide, as well as the tetrasulfides described in Japanese Patent Laid-Open No. 248116/'94, including γ-trimethoxysilylpropyl dimethylthiocarbamyl tetrasulfide and γ-trimethoxysilylpropyl benzothiazyl tetrasulfide.

These silane coupling agents may be used alone or in admixture of two or more. The amount of silane coupling agent used is usually in the range of 0.1 to 30 parts by weight, preferably 1 to 20 parts by weight, and more preferably 2 to 10 parts by weight, per 100 parts by weight of silica.

Fatty Acid Salt

No particular limitation is placed on the type of the fatty acid salt. However, fatty acid metal salts may usually be used. The fatty acid used may be either a saturated fatty acid or an unsaturated fatty acid. Its number of carbon atoms is usually in the range of 1 to 36, preferably 5 to 25, and more preferably 10 to 20. Useful fatty acids include, for example, formic acid, acetic acid, propionic acid, butyric acid, valeric acid, octanoic acid, dodecanoic acid, octenoic acid, stearic acid, lauric acid, oleic acid and eicosanoic acid. Among them, octenoic acid, stearic acid, lauric acid, oleic acid and eicosanoic acid are preferred; and stearic acid and lauric acid are particularly preferred. Examples of metal salts include alkali metal salts such as lithium, sodium, potassium, rubidium and cesium salts; alkaline earth metal salts such as beryllium, magnesium, calcium, strontium and barium salts; salts of group III metals in the periodic table, such as aluminum salts; salts of group IV metals in the periodic table, such as tin and lead salts; salts of group V metals in the periodic table, such as antimony and bismuth salts; and transition metal salts such as titanium, chromium, manganese, iron, cobalt, nickel, copper, zinc, yttrium, silver, cadmium and lanthanum salts. Among them, alkali metal salts, alkaline earth metal salts and transition metal salts are preferred; and alkali metal salts and alkaline earth metal salts are particularly preferred.

Specific examples of preferred fatty acid salts include sodium formate, sodium acetate, calcium acetate, zinc acetate, silver acetate, chromium acetate, cobalt acetate, strontium acetate, iron acetate, copper acetate, lead acetate, nickel acetate, beryllium acetate, manganese acetate, magnesium propionate, sodium butyrate, calcium valerate, copper octanoate, potassium octanoate, lithium dodecanoate, lithium octenoate, sodium octenoate, calcium octenoate, barium octenoate, iron octenoate, cobalt octenoate, copper octenoate, zinc octenoate, lithium stearate, sodium stearate, potassium stearate, rubidium stearate, cesium stearate, beryllium stearate, magnesium stearate, calcium stearate, strontium stearate, barium stearate, lead stearate, chromium stearate, manganese stearate, iron stearate, cobalt stearate, nickel stearate, cadmium stearate, zinc stearate, lithium laurate, sodium laurate, potassium laurate, rubidium laurate, cesium laurate, beryllium laurate, magnesium laurate, calcium laurate, strontium laurate, barium laurate, zinc laurate, iron laurate, sodium oleate, potassium oleate, magnesium oleate, calcium oleate, zinc oleate, sodium eicosanoate and calcium eicosanoate.

Among these fatty acid salts, copper octanoate, potassium octanoate, lithium dodecanoate, lithium octenoate, sodium octenoate, calcium octenoate, barium octenoate, iron octenoate, cobalt octenoate, copper octenoate, zinc octenoate, lithium stearate, sodium stearate, potassium stearate, rubidium stearate, cesium stearate, beryllium stearate, magnesium stearate, calcium stearate, strontium stearate, barium stearate, lead stearate, chromium stearate, manganese stearate, iron stearate, cobalt stearate, nickel stearate, cadmium stearate, zinc stearate, lithium laurate, sodium laurate, potassium laurate, rubidium laurate, cesium laurate, beryllium laurate, magnesium laurate, calcium laurate, strontium laurate, barium laurate, zinc laurate, iron laurate, sodium oleate, potassium oleate, magnesium oleate, calcium oleate, zinc oleate, sodium eicosanoate and calcium eicosanoate are preferred; and lithium octenoate, sodium octenoate, calcium octenoate, barium octenoate, lithium stearate, sodium stearate, potassium stearate, rubidium stearate, cesium stearate, beryllium stearate, magnesium stearate, calcium stearate, strontium stearate, barium stearate, lithium laurate, sodium laurate, potassium laurate, rubidium laurate, cesium laurate, beryllium laurate, magnesium laurate, calcium laurate, strontium laurate, barium laurate, sodium oleate, potassium oleate, magnesium oleate and calcium oleate are particularly preferred.

These fatty acid salts may be used alone or in admixture of two or more. The amount of fatty acid salt used is in the range of 0.1 to 15 parts by weight, preferably 0.5 to 10 parts by weight, and more preferably 1 to 5 parts by weight, per 100 parts by weight of the diene rubber component.

Rubber Compositions

In addition to the above-described components, the rubber compositions of the present invention may contain desired amounts of conventional compounding ingredients such as vulcanizing agents, vulcanization accelerators, vulcanization activators, antioxidants, activators, plasticizers, lubricants and fillers.

No particular limitation is placed on the type of the vulcanizing agent. Examples thereof include sulfur such as powdered sulfur, precipitated sulfur, colloidal sulfur, insoluble sulfur and highly dispersible sulfur; sulfur halides such as sulfur monochloride and sulfur dichloride; organic peroxides such as dicumyl peroxide and di-tert-butyl peroxide; quinone dioximes such as p-quinone dioxime and p,p'-dibenzoylquinone dioxime; organic multivalent amine compounds such as triethylenetetramine, hexamethylenediamine carbamate and 4,4'-methylenebis-o-chloroaniline; and alkylphenol resins having a methylol group. Among them, sulfur is preferred, and powdered sulfur is particularly preferred. These vulcanizing agents may be used alone or in admixture of two or more.

The amount of vulcanizing agent used is usually in the range of 0.1 to 15 parts by weight, preferably 0.3 to 10 parts by weight, and more preferably 0.5 to 5 parts by weight, per 100 parts by weight of the diene rubber component. When the amount of vulcanizing agent used is in this range, there can be obtained a vulcanized product which is excellent not only in tensile strength and abrasion resistance, but also in properties such as heat resistance and residual strain.

Examples of the vulcanization accelerators include sulfenamide type vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide and N,N'-diisopropyl-2-benzothiazole sulfenamide; guanidine type vulcanization accelerators such as diphenylguanidine, di-o-tolylguanidine and o-tolylbiguanidine; thiourea type vulcanization accelerators such as thiocarbanilide, di-o-tolylthiourea, ethylenethiourea, diethylthiourea and trimethylthiourea; thiazole type vulcanization accelerators such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt and 2-(2,4-dinitrophenylthio)benzothiazole; thiuram type vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamate type vulcanization accelerators such as sodium dimethyldithiocarbamate, sodium diethyidithiocarbamate, sodium di-n-butylthiocarbamate, lead dimethyidithiocarbamate, zinc dimethyidithiocarbamate, zinc diethyldithiocarbamate, zinc di-n-butyidithiocarbamate, zinc pentamethylenedithiocarbamate, zinc ethylphenyldithiocarbamate, tellurium diethyidithiocarbamate, selenium dimethyldithiocarbamate, selenium diethyidithiocarbamate, copper dimethyidithiocarbamate, iron dimethyidithiocarbamate, diethyldithiocarbamic acid diethylamine salt, pentamethylenedithiocarbamic acid piperidine salt and methylpentamethylenedithiocarbamic acid pipecoline salt; and xanthogenate type vulcanization accelerators such as sodium isopropylxanthogenate, zinc isopropylxanthogenate and zinc butylxanthogenate.

These vulcanization accelerators may be used alone or in admixture of two or more. However, it is especially preferable to use a vulcanization accelerator comprising at least a sulfenamide vulcanization accelerator. The amount of vulcanization accelerator used is usually in the range of 0.1 to 15 parts by weight, preferably 0.3 to 10 parts by weight, and more preferably 0.5 to 5 parts by weight, per 100 parts by weight of the diene rubber component.

No particular limitation is placed on the type of the vulcanization activator. For example, higher fatty acids (e.g., stearic acid) and zinc oxide may be used. In the case of zinc oxide, it is preferable to use zinc oxide having a particle size of, for example, not greater than 5 $\mu$m and hence high surface activity. Specific examples thereof include active zinc oxide having a particle size of, for example, 0.05 to 0.2 $\mu$m and zinc oxide having a particle size of, for example, 0.3 to 1 $\mu$m. Moreover, zinc oxide treated with an amine type dispersing agent or wetting agent may also be used.

These vulcanization activators may be used alone or in admixture of two or more. The amount of vulcanization activator used may be suitably chosen according to the type of the vulcanization activator. When a higher fatty acid is used, its amount used is usually in the range of 0.05 to 15 parts by weight, preferably 0.1 to 10 parts by weight, and more preferably 0.5 to 5 parts by weight, per 100 parts by weight of the rubber component. When zinc oxide is used, its amount used is usually in the range of 0.05 to 10 parts by weight, preferably 0.1 to 5 parts by weight, and more preferably 0.5 to 2 parts by weight, per 100 parts by weight of the rubber component. When the amount of zinc oxide used is in this range, a highly balanced combination of properties such as processability, tensile strength and abrasion resistance is achieved.

Examples of other compounding ingredients include coupling agents other than silane coupling agents; activators such as diethylene glycol, polyethylene glycol and silicone oil; fillers such as calcium carbonate, talc and clay; process oils; and waxes.

The rubber compositions of the present invention can be obtained by kneading a mixture of various ingredients in the usual manner. For example, the rubber compositions can be obtained by mixing the diene rubber component with compounding ingredients other than the vulcanizing agent and the vulcanization accelerator, and then incorporating the vulcanizing agent and the vulcanization accelerator into the resulting mixture. One exemplary procedure using silica as the reinforcing agent is described below.

In order to mix the diene rubber component with compounding ingredients other than the vulcanizing agent and the vulcanization accelerator, it is preferable to first mix the diene rubber component with at least a portion of silica by means of a mixing machine such as a roll mill or a Banbury mixer, and then mix the resulting mixture with the remaining compounding ingredients, except the vulcanizing agent and the vulcanization accelerator. This makes it possible to enhance the dispersibility of silica and thereby yield a rubber composition having more excellent properties. In this case, silica may be added at a time. However, if a predetermined amount of silica is divided into two or more portions and added separately, the silica can be easily dispersed and this makes it easier to mix the silica with the diene rubber component. For example, 10 to 90% of the silica may be added at the first time and the remainder may be added at the second time or later. The temperature at which the diene rubber component is mixed with silica is usually in the range of 80 to 200° C, preferably 100 to 190° C., and more preferably 140 to 180° C. If this temperature is unduly low, a sufficient improvement in abrasion resistance will not be achieved, while it is unduly high, the diene rubber component may undergo yellowing. The mixing time is usually not less than 30 seconds and preferably in the range of 1 to 30 minutes. After the resulting mixture is usually cooled to 100° C. or below and preferably to a temperature ranging from room temperature to 80° C., the vulcanizing agent and the vulcanization accelerator are added thereto and kneaded to form a rubber composition in accordance with the present invention. Then, this composition may usually be press-cured at a temperature of 120 to 200° C. and preferably 140 to 180° C. to obtain a vulcanized rubber.

BEST MODE FOR CARRYING OUT THE INVENTION

The present invention is more specifically described with reference to the following preparation examples, examples and comparative examples. In these examples, all parts and percentages are by weight unless otherwise stated.

Various properties were measured according to the following methods.

(1) The content of bound styrene in a copolymer was determined according to JIS K6383 (the refractive index method).

(2) The content of amino-containing combined monomer units in a copolymer was determined by dissolving the copolymer in tetrahydrofuran, subjecting this solution twice to a reprecipitation/coagulation treatment with methanol/acetone (50/50% by volume), drying the resulting precipitate in vacuo, and analyzing it by 500 MHz $^1$H-NMR.

(3) Mooney viscosity ($ML_{1+4}$, 100° C.) was measured according to JIS K6301.

(4) As to tensile strength, modulus at 300% stress (in Kgf/cm$^2$) was measured according to JIS K6301.

(5) As to heat build-up, tan δ at 1% torsion, 20 Hz and 60° C. was measured with an RDA-II (manufactured by Rheometrics Co.). This property was expressed in terms of an index number (i.e., tan δ 60° C. index). Greater values of this index number indicate more desirable heat build-up characteristics.

(6) Abrasion resistance was measured with a pico abrasion tester according to ASTM D2228. This property was expressed in terms of an index number (i.e., abrasion resistance index). Greater values of this index number indicate more desirable abrasion resistance.

(7) Processability was evaluated by observing the way of winding around the rolls and rating it on the following basis.

5: The rubber composition winds around the rolls neatly.
4: The rubber composition lifts up slightly.
3: The rubber composition winds around the rolls, but about a half of it lifts up.
2: The rubber composition winds around the rolls, but lifts up frequently.
1: The rubber composition scarcely winds around the rolls.

PREPARATION EXAMPLES 1–2

A tank fitted with a stirrer was charged with 200 parts of water, 3 parts of rosin soap, 0.15 part of t-dodecyl mercaptan, and each of the monomer compositions shown in Table 1. While the temperature of the reactor was maintained at 5° C., polymerization was initiated by the addition of a radical polymerization initiator comprising 0.1 part of cumene hydroperoxide, 0.2 part of sodium formaldehyde sulfoxylate and 0.01 part of ferric sulfate. When the degree of conversion reached 70%, the reaction was stopped by the addition of diethylhydroxylamine. Then, unreacted monomers were recovered, and a naphthenic oil was mixed in an amount of 37.5 parts by weight per 100 parts by weight of the polymer. The resulting mixture was coagulated with sulfuric acid and sodium chloride to form crumbs, followed by drying with a crumb dryer. Thus, diene rubber Nos. 1 and 2 were obtained. Properties of these diene polymers are shown in Table 1.

TABLE 1

| Diene rubber No. | 1 | 2 |
|---|---|---|
| Amount charged (parts) | | |
| Butadiene | 67 | 55 |
| Styrene | 32 | 44 |
| HEMA (*1) | 1 | — |
| DMAPAA (*2) | — | 1 |
| Content (wt. %) | | |
| Styrene | 25.1 | 36.5 |
| Polar group-containing monomer | 1.2 | 0.5 |
| Process oil (*3) | 37.5 | — |
| Process oil (*4) | — | 37.5 |
| Mooney viscosity ($ML_{1+4}$, 100° C.) | 52 | 52 |

(*1) Hydroxyethyl methacrylate.
(*2) N,N-Dimethylaminopropylacrylamide.
(*3) Sunsen 410 (manufactured by Japan Sun Oil Co., Ltd.; a naphthenic oil).
(*4) Flex M (manufactured by Fuji Kosan Co., Ltd.; an aromatic oil).

PREPARATION EXAMPLE 3

An autoclave fitted with a stirrer was charged with 8,000 g of cyclohexane, 400 g of styrene and 800 g of butadiene. Then, 10 millimoles of tetramethylethylenediamine (TMEDA) and 10 millimoles of n-butyllithium were added to initiate polymerization at 40° C. Ten minutes after the start of the polymerization, 800 g of additional butadiene was continuously added. After it was confirmed that the degree of conversion reached 100%, 10 millimoles of N-methyl-ε-caprolactam (NMC) was added and reacted for 20 minutes. After completion of the reaction, 20 millimoles of methanol was added as a stopper. After the addition of 20 g of 2,6-di-t-butylphenol, the polymer was recovered by steam stripping. Thus, diene rubber No. 3 was obtained. Properties of this polymer are shown in Table 2.

PREPARATION EXAMPLES 4–7

Employing the polymerization conditions shown in Table 2, polymerization was carried out in the same manner as in Preparation Example 3. Thereafter, tin tetrachloride ($SnCl_4$) was added in the amount shown in Table 2 and reacted for 30 minutes. Then, butadiene was added in an amount equal to double the molar amount of n-butyllithium used and reacted for 15 minutes. Subsequently, the modifying agent shown in Table 2 was added and reacted for 30 minutes. Thereafter, the polymer was recovered in the same manner as in Preparation Example 3. Thus, diene rubber Nos. 4 to 7 were obtained. Properties of these polymers are shown in Table 2.

TABLE 2

| Diene rubber No. | 3 | 4 | 5 | 6 | 7 |
|---|---|---|---|---|---|
| Polymerization conditions | | | | | |
| Amount of styrene charged (g) | 800 | 310 | 460 | 400 | 460 |
| Amount of butadiene charged (g) | 800 | 600 | 700 | 800 | 700 |
| Amount of butadiene after-added (g) | 400 | 1090 | 840 | 800 | 840 |
| Minimum temperature (° C.) | 50 | 50 | 50 | 40 | 50 |
| Maximum temperature (° C.) | 80 | 70 | 70 | 60 | 70 |
| Amount of n-butyllithium (mmol) | 10 | 12 | 11 | 10 | 11 |
| TMEDA (mmol) | 20 | 4.0 | 3.5 | 10 | 3.5 |
| $SnCl_4$ (mmol) | — | 1.2 | 1.1 | 1.0 | 1.1 |

TABLE 2-continued

| Diene rubber No. | 3 | 4 | 5 | 6 | 7 |
|---|---|---|---|---|---|
| Type of modifying agent (*1) | NMC | EO | NVP | EAB | — |
| Modifying agent (mmol) | 10 | 8 | 8 | 8 | — |
| Polymer properties | | | | | |
| Content of bound styrene (wt. %) | 40.8 | 15.6 | 22.9 | 20.8 | 22.1 |
| Content of 1,2-vinyl (wt. %) | 51.0 | 32.0 | 33.1 | 63.1 | 34.2 |
| Mooney viscosity (ML$_{4+1}$, 100° C.) | 65 | 71 | 70 | 68 | 71 |

(*1) NMC: N-Methyl-ε-caprolactam.
EO: Ethylene oxide.
NVP: N-vinylpyrrolidone.
EAB: 4,4'-Bis(diethylamino)benzophenone.

EXAMPLES 1–8 AND COMPARATIVE EXAMPLE 1

Each of diene rubber Nos. 1 and 2 prepared in the foregoing Preparation Examples and the commercially available diene rubbers shown in Table 4 was used as the raw rubber. According to the formulation shown in Table 3, all of the raw rubber, half of silica, and half of the silane coupling agent were mixed at 170° C. for 2 minutes in a Brabender type mixer having a capacity of 250 ml. Then, the remaining compounding ingredients, except sulfur and the vulcanization accelerator, were added and this mixture was kneaded at the same temperature for 3 minutes. The amounts of raw rubber, silica, carbon black, silane coupling agent, process oil and fatty acid salt used are shown in Table 4.

Subsequently, the resulting mixture, sulfur and the vulcanization accelerator were added to an open roll mill kept at 50° C., and kneaded therein. Thereafter, specimens were prepared by press curing at 160° C. for 30 minutes and used to measure various properties. The results thus obtained are shown in Table 4.

TABLE 3

| Formulation 1 | First time | Second time | Third time |
|---|---|---|---|
| Raw rubber | All | — | — |
| Silica | Half | Half | — |
| Carbon black (*1) | — | All | — |
| Silane coupling agent (*2) | Half | Half | — |
| Process Oil (*3) | — | Variable | — |
| Zinc oxide (*4) | — | Variable | — |
| Stearic acid | — | 2 | — |
| Fatty acid salt (*5) | — | 3 | — |
| Wax (*6) | — | 5 | — |
| Antioxidant (*7) | — | 2 | — |
| Sulfur | — | — | 1.5 |
| Vulcanization accelerator (*8) | — | — | 3 |

(*1) Seast KH (manufactured by Tokai Carbon Co., Ltd.).
(*2) Si 69 (manufactured by Degussa Co.).
(*3) Flex M (manufactured by Fuji Kosan Co., Ltd.).
(*4) Zinc Oxide #1 (manufactured by Honsho Chemical Co., Ltd.; particle size = 0.4 μm).
(*5) Calcium stearate (manufactured by Asahi Denka Kogyo K.K.).
(*6) Splendor R-100 (manufactured by Kao Corporation).
(*7) Nocrak 6C (manufactured by Ooucgi Shinko Co., Ltd.).
(*8) Nocceler CZ (manufactured by Ooucgi Shinko Co., Ltd.).

TABLE 4

| | Example | | | | | | | | Comparative Example |
|---|---|---|---|---|---|---|---|---|---|
| | 1 | 2 | 3 | 4 | 5 | 6 | 7 | 8 | 1 |
| Rubber component (parts) (*1) | | | | | | | | | |
| Diene rubber No. 1 | 137.5 (100) | 137.5 (100) | — | — | — | — | — | — | — |
| Diene rubber No. 2 | — | — | 137.5 (100) | 137.5 (100) | 68.75 (50) | — | — | — | — |
| SBR 1778J (*2) | — | — | — | — | — | 137.5 (100) | — | 137.5 (100) | 137.5 (100) |
| SBR 9520 (*3) | — | — | — | — | — | — | 137.5 (100) | — | — |
| IR 2200 (*4) | — | — | — | — | 50 | — | — | — | — |
| Compounding ingredients (parts) | | | | | | | | | |
| Silica (*5) | 80 | 80 | 80 | — | 50 | 80 | 80 | — | — |
| Silica (*6) | — | — | — | 80 | — | — | — | 80 | 80 |
| Carbon black | — | — | — | — | 30 | — | — | — | — |
| Silane coupling agent | 4 | 4 | 4 | 4 | 3 | 4 | 4 | 4 | 4 |
| Process oil | — | — | — | — | 18.75 | — | — | — | — |
| Fatty acid salt | 2 | 4 | 2 | 2 | 2 | 2 | 2 | 2 | — |
| 300% stress (Kgf/cm$^2$) | 155 | 162 | 142 | 133 | 153 | 135 | 139 | 109 | 80 |
| tan δ 60° C. index (*7) | 127 | 131 | 133 | 127 | 127 | 119 | 116 | 116 | 100 |
| Abrasion resistance index (*7) | 145 | 156 | 128 | 121 | 138 | 112 | 109 | 107 | 100 |
| Processability | 5 | 5 | 5 | 5 | 5 | 4 | 4 | 4 | 4 |

(*1) The value in parentheses is the weight of the rubber component freed of oil.
(*2) Oil-extended SBR (manufactured by Nippon Zeon Co., Ltd.; bound styrene content = 23.5% by weight; Mooney viscosity (ML$_{1+4}$, 100° C.) = 42; a naphthenic oil).
(*3) Oil-extended SBR (manufactured by Nippon Zeon Co., Ltd.; bound styrene content = 35% by weight; Mooney viscosity (ML$_{1+4}$, 100° C.) = 49; an aromatic oil).

TABLE 4-continued

|  | Example | | | | | | | | Comparative Example |
|---|---|---|---|---|---|---|---|---|---|
|  | 1 | 2 | 3 | 4 | 5 | 6 | 7 | 8 | 1 |

(*4) High-cis polyisoprene rubber (manufactured by Nippon Zeon Co., Ltd.; Mooney viscosity ($ML_{1+4}$, 100° C.) = 83).
(*5) Z1165 MP (manufactured by Rhone-Poulenc Co.; nitrogen adsorption specific surface area = 175 $m^2/g$).
(*6) Nipsil VN3 (manufactured by Nippon Silica Co., Ltd.; nitrogen adsorption specific surface area = 240 $m^2/g$).
(*7) These indices are expressed by taking the values of Comparative Example 1 as 100.

It can be seen from the results shown in Table 4 that the vulcanized rubbers obtained from the rubber compositions of the present invention (Examples 1–8) are excellent in all properties including tensile strength, heat build-up, abrasion resistance and processability. Moreover, it can be seen that, especially when a diene rubber having a heteroatom-containing polar group such as a hydroxyl group or a tertiary amino group is used as the diene rubber component (Examples 1–5), all properties including tensile strength, heat build-up, abrasion resistance and processability are highly balanced. Furthermore, it can be seen that tensile strength, heat build-up and abrasion resistance are further improved by using silica having a small specific surface area (by comparison of Examples 3 and 4 or Examples 6 and 8) and that excellent heat build-up and abrasion resistance are achieved even by the combined use of natural rubber and carbon black (Example 5).

EXAMPLES 9–13 AND COMPARATIVE EXAMPLES 2–3

Using each of the raw rubbers shown in Table 6, the following procedure was performed according to Formulation 2 shown in Table 5. First of all, all of the raw rubber, half of silica, and half of the silane coupling agent were placed in a Banbury mixer having a capacity of 250 ml, and kneaded at 160° C. for 2 minutes. Then, the remaining compounding ingredients, except sulfur and the vulcanization accelerator, were added and this mixture was kneaded at the same temperature for 2.5 minutes. Subsequently, the resulting mixture, sulfur and the vulcanization accelerator were added to an open roll mill kept at 50° C., and kneaded therein. Thereafter, specimens were prepared by press curing at 160° C. for 30 minutes and used to measure various properties. The results thus obtained are shown in Table 6.

TABLE 5

| Formulation 2 | First time | Second time | Third time |
|---|---|---|---|
| Raw rubber | All | — | — |
| Silica | Half | Half | — |
| Silane coupling agent (*1) | Half | Half | — |
| Process Oil | — | Variable | — |
| Diethylene glycol | — | Variable | — |
| Zinc oxide (*2) | — | 2 | — |
| Stearic acid | — | Variable | — |
| Fatty acid salt | — | Variable | — |
| Antioxidant (*3) | — | 2 | — |
| Sulfur | — | — | 1.4 |
| Vulcanization accelerator (*4) | — | — | Variable |

(*1) Si 69 (manufactured by Degussa Co.).
(*2) Zinc Oxide #1 (manufactured by Honsho Chemical Co., Ltd.).
(*3) Nocrak 6C (manufactured by Oouchi Shinko Co., Ltd.).
(*4) Nocceler CZ (manufactured by Oouchi Shinko Co., Ltd.).

TABLE 6

|  | Example | | | | | Comparative Example | |
|---|---|---|---|---|---|---|---|
|  | 9 | 10 | 11 | 12 | 13 | 2 | 3 |
| Rubber component (parts) | | | | | | | |
| Diene rubber No. 3 | 70 | — | — | — | — | — | — |
| Diene rubber No. 4 | — | — | — | — | — | — | — |
| Diene rubber No. 5 | — | — | 100 | — | — | — | — |
| Diene rubber No. 6 | — | 100 | — | 100 | — | — | — |
| Diene rubber No. 7 | — | — | — | — | 100 | 100 | 100 |
| IR 2200 (*1) | 30 | — | — | — | — | — | — |
| Compounding ingredients (parts) | | | | | | | |
| Silica (*2) | 40 | 50 | 50 | — | — | — | — |
| Silica (*3) | — | — | — | 50 | 50 | 50 | 50 |
| Carbon black | 20 | — | — | — | — | — | — |
| Silane coupling agent | 2 | 3 | 4 | 3 | 3 | 3 | 3 |
| Process oil (*4) | 10 | — | 10 | 10 | 20 | 20 | 20 |
| Process oil (*5) | — | 10 | — | — | — | — | — |

TABLE 6-continued

|  | Example | | | | | Comparative Example | |
| --- | --- | --- | --- | --- | --- | --- | --- |
|  | 9 | 10 | 11 | 12 | 13 | 2 | 3 |
| Fatty acid salt (*6) | — | 2 | 2 | 2 | 2 | — | — |
| Fatty acid salt (*7) | 2 | — | — | — | — | — | — |
| Stearic acid | 2 | 2 | 2 | 2 | 2 | 4 | 2 |
| Vulcanization accelerator | 2.5 | 2 | 2.5 | 2 | 2 | 2 | 2 |
| 300% stress (Kgf/cm$^2$) | 148 | 115 | 128 | 135 | 116 | 90 | 100 |
| tan δ 60° C. index (*8) | 128 | 136 | 122 | 125 | 107 | 105 | 100 |
| Abrasion resistance index (*8) | 155 | 114 | 122 | 114 | 104 | 75 | 100 |
| Processability | 5 | 4 | 4 | 5 | 4 | 3 | 3 |

(*1) High-cis polyisoprene (manufactured by Nippon Zeon Co., Ltd.).
(*2) 1165 MP (manufactured by Rhone-Poulenc Co., nitrogen adsorption specific surface area = 175 m$^2$/g).
(*3) Nipsil VN3 (manufactured by Nippon Silica Co., Ltd.; nitrogen adsorption specific surface area = 240 m$^2$/g).
(*4) KF-96-200 (manufactured by Shin-etsu Chemical Co., Ltd.; silcone oil).
(*5) Flex M (manufactured by Fuji Kosan Co., Ltd.).
(*6) Lithium stearate (manufactured by Sakai Chemical Industry Co., Ltd.).
(*7) Calcium laurate (manufactured by Nippon Oil & Fats Co., Ltd.).
(*8) These indices are expressed by taking the values of Example 3 as 100.

It can be seen from the results shown in Table 6 that the vulcanized rubbers obtained from the rubber compositions of the present invention (Examples 9–13) are excellent in all properties including tensile strength, heat build-up, abrasion resistance and processability. Moreover, it can be seen that, when a diene rubber having a heteroatom-containing polar group introduced thereinto is used as the diene rubber component (Examples 9–12), all properties including tensile strength, heat build-up, abrasion resistance and processability are highly balanced. On the other hand, it can be seen that tensile strength and abrasion resistance are reduced when an increased amount of a fatty acid (e.g., stearic acid) is used in place of the fatty acid salt (Comparative Example 2).

Various embodiments of the present invention are given below.

(1) A rubber composition comprising 100 parts by weight of a diene rubber component, 10 to 200 parts by weight of a reinforcing agent, and 0.1 to 15 parts by weight of a fatty acid salt.

(2) A rubber composition as described in (1) wherein the Mooney viscosity (ML$_{1+4}$, 100° C.) of the diene rubber component is in the range of 10 to 200.

(3) A rubber composition as described in (1) or (2) wherein the diene rubber is at least one member selected from the group consisting of natural rubber, polyisoprene rubber, polybutadiene rubber, styrenebutadiene copolymers and styrene-isoprene-butadiene terpolymers.

(4) A rubber composition as described in (1) or (2) wherein the diene rubber comprises a diene rubber having a heteroatom-containing polar group, or a diene rubber having a heteroatom-containing polar group and another diene rubber.

(5) A rubber composition as described in (4) wherein the heteroatom is an atom of an element belonging to the second to fourth period of the periodic table and group VB or VIB thereof.

(6) A rubber composition as described in (5) wherein the heteroatom is a nitrogen, oxygen, sulfur or phosphorus atom.

(7) A rubber composition as described in (4) wherein the heteroatom-containing polar group is a hydroxyl, oxy, epoxy, carboxyl, carbonyl, oxycarbonyl, sulfide, disulfide, sulfonyl, sulfinyl, thiocarbonyl, imino, amino, nitrile, ammonium, imido, amido, hydrazo, azo or diazo group.

(8) A rubber composition as described in any of (4) to (7) wherein the diene rubber having a heteroatom-containing polar group is a copolymer containing units of a polar group-containing vinyl monomer, such as a copolymer formed from a vinyl monomer having a heteroatom-containing polar group and a conjugated diene, or a copolymer formed from a vinyl monomer having a hetero-atom-containing polar group, a conjugated diene and an aromatic vinyl.

(9) A rubber composition as described in (8) wherein the diene rubber having a heteroatom-containing polar group is a copolymer composed of 0.01 to 20% by weight of combined vinyl monomer units having a heteroatom-containing polar group, 40 to 99.99% by weight of combined conjugated diene units, and 0 to 55% by weight of combined aromatic vinyl units.

(10) A rubber composition as described in (8) or (9) wherein the vinyl monomer having a heteroatom-containing polar group is at least one member selected from the group consisting of an amino-containing vinyl monomer, a hydroxyl-containing vinyl monomer and an oxy-containing vinyl monomer.

(11) A rubber composition as described in (10) wherein the amino-containing vinyl monomer is a tertiary amino-containing vinyl monomer.

(12) A rubber composition as described in (11) wherein the tertiary amino-containing vinyl monomer is at least one member selected from the group consisting of an N,N-disubstituted aminoalkylate, an N,N-disubstituted aminoalkylacrylamide, an N,N-disubstituted amino aromatic vinyl compound and a pyridyl-containing vinyl compound.

(13) A rubber composition as described in (10) wherein the hydroxyl-containing vinyl monomer is a hydroxyl-containing unsaturated carboxylic acid monomer.

(14) A rubber composition as described in (13) wherein the hydroxyl-containing unsaturated caroxylic acid monomer is a hydroxyl-containing acrylic ester or a hydroxyl-containing methacrylic ester.

(15) A rubber composition as described in any of (4) to (7) wherein the diene rubber having a heterotom-containing polar group is a polar group-containing diene rubber obtained by reacting a modifying agent with a polymer of a conjugated diene which has a combined active metal in the molecule, or a copolymer of a conjugated diene and an aromatic vinyl which has a combined active metal in the molecule, and thereby introducing a polar group into the polymer or copolymer.

(16) A rubber composition as described in (15) wherein the diene rubber having a heteroatom-containing polar group is a polymer or copolymer composed of 40 to 100% by weight of combined conjugated diene units and 60 to 0% by weight of combined aromatic vinyl units.

(17) A rubber composition as described in (15) or (16) wherein the active metal is a metal capable of anionic polymerization.

(18) A rubber composition as described in (17) wherein the metal capable of anionic polymerization is an alkali metal.

(19) A rubber composition as described in any of (15) to (18) wherein the active metal is attached to an end of the polymer chain.

(20) A rubber composition as described in (19) wherein the polymer or copolymer having an active metal attached to an end of the polymer chain is one obtained by anionic polymerization.

(21) A rubber composition as described in any of (15) to (20) wherein the modifying agent is at least one member selected from the group consisting of ketones, esters, aldehydes, epoxies, epihalohydrins, carbodiimides, Schiff bases and cyclic imine compounds having 2 or 3 carbon atoms.

(22) A rubber composition as described in any of (15) to (20) wherein the modifying agent is a compound having, in the molecule, a functional group reactive with the active metal and a heteroatom-containing polar group.

(23) A rubber composition as described in (22) wherein the functional group reactive with the active metal is a carbon-carbon unsaturated group, a halogen atom or a carbonyl group.

(24) A rubber composition as described in (23) wherein the carbon-carbon unsaturated group is a vinyl group.

(25) A rubber composition as described in any of (22) to (24) wherein the heteroatom-containing polar group is a hydroxyl, oxy or amino group.

(26) A rubber composition as described in (22) wherein the compound having a functional group and a polar group in the molecule is a compound having vinyl and hydroxyl groups, a compound having vinyl and amino groups, a compound having vinyl and alkoxysilyl groups, a compound having a halogen atom and an alkoxysilyl group, or a compound having carbonyl and amino groups.

(27) A rubber composition as described in any of (15) to (26) wherein, in the diene rubber having a heteroatom-containing polar group, the proportion of vinyl linkages in the combined conjugated diene units is in the range of 10 to 90%.

(28) A rubber composition as described in any of (8) to (27) wherein the conjugated diene is butadiene or isoprene.

(29) A rubber composition as described in any of (8) to (28) wherein the aromatic vinyl is styrene.

(30) A rubber composition as described in any of (1) to (29) wherein the fatty acid salt is a fatty acid metal salt.

(31) A rubber composition as described in (30) wherein the fatty acid metal salt is at least one member selected from the group consisting of alkali metal, alkaline earth metal and transition metal salts of fatty acids.

(32) A rubber composition as described in (30) or (31) wherein the fatty acid has 1 to 36 carbon atoms.

(33) A rubber composition as described in any of (1) to (32) wherein the reinforcing agent is carbon black.

(34) A rubber composition as described in any of (1) to (32) wherein the reinforcing agent is silica.

(35) A rubber composition as described in any of (1) to (32) wherein the reinforcing agent comprises carbon black and silica.

(36) A rubber composition as described in (35) wherein silica and carbon black are used in a weight ratio of 10:90 to 99:1.

(37) A rubber composition as described in any of (34) to (36) wherein the specific surface area of silica is in the range of 50 to 400 $m^2/g$ as expressed in terms of a nitrogen adsorption specific surface area (measured by the BET method).

(38) A rubber composition as described in any of (1) to (37) which further contains a silane coupling agent.

(39) A rubber composition as described in (38) wherein the silane coupling agent is used in an amount of 0.1 to 30 parts by weight per 100 parts by weight of silica.

(40) A rubber composition as described in any of (1) to (39) which further contains a vulcanizing agent, a vulcanization accelerator and a vulcanization activator.

(41) A rubber composition as described in (40) which contains 0.1 to 15 parts by weight of the vulcanizing agent and 0.1 to 15 parts by weight of the vulcanization accelerator per 100 parts by weight of the rubber component.

(42) A rubber composition as described in (40) or (41) which contains at least a sulfenamide type vulcanization accelerator as the vulcanization accelerator.

(43) A rubber composition as described in any of (40) to (42) which contains zinc oxide as the vulcanization activator.

(44) A rubber composition as described in (43) wherein the particle size of zinc oxide is not greater than 5 $\mu$m.

(45) A rubber composition as described in (43) or (44) wherein zinc oxide is used in an amount of 0.05 to 10 parts by weight per 100 parts by weight of the rubber component.

INDUSTRIAL APPLICABILITY

The compositions of the present invention yield vulcanized rubbers showing marked improvements in tensile strength and abrasion resistance and having excellent processability, without detracting from excellent rolling resistance characteristic of silica-filled materials. These rubber compositions can be used in various applications by making the most of such properties. For example, they can be used as materials for forming various parts of tires, such as tread, carcass, sidewalls and beads; for rubber products such as hoses, window frames, belts, shoe soles, rubber vibration isolators and automobile parts; and as reinforcing rubbers for resins such as impact-resistant polystyrene and ABS resin. In particular, they can be expected to be highly useful for the tire treads of, for example, low-fuel-consumption tires, all-season tires, high-performance tires and studless tires.

What is claimed is:

1. A rubber composition comprising 100 parts by weight of a diene rubber component, 10 to 200 parts by weight of a reinforcing agent comprising silica alone or a combination of silica and carbon black, the weight ratio of silica to carbon black being in the range of 50:50 to 90:10, and 0.1 to 15 parts by weight of an alkali metal salt or an alkaline earth metal salt of a fatty acid having 5 to 25 carbon atoms, and a silane coupling agent in an amount of 0.1 to 30 parts per 100 parts by weight of silica.

2. A rubber composition as claimed in claim 1, wherein the Mooney viscosity ($ML_{1+4}$, 100° C.) of the diene rubber component is in the range of 10 to 200.

3. A rubber composition as claimed in claim 1, wherein the diene rubber is at least one member selected from the group consisting of natural rubber, polyisoprene rubber, polybutadiene rubber, styrene-butadiene copolymers and styrene-isoprene-butadiene terpolymers.

4. A rubber composition as claimed in claim 1, wherein the diene rubber comprises a diene rubber having a heteroatom-containing polar group, or such a polar group-containing diene rubber and another diene rubber.

5. A rubber composition as claimed in claim 4, wherein the weight ratio of the diene rubber having a heteroatom-containing polar group to the other diene rubber ranges from 10:90 to 90:10.

6. A rubber composition as claimed in claim 4, wherein the other diene rubber is at least one member selected from the group consisting of natural rubber, polyisoprene rubber, polybutadiene rubber, styrene-butadiene copolymers and styrene-isoprene-butadiene terpolymers.

7. A rubber composition as claimed in claim 4, wherein the diene rubber having a heteroatom-containing polar group is a copolymer formed from a vinyl monomer having a heteroatom-containing polar group and a conjugated diene, or a copolymer formed from a vinyl monomer having a heteroatom-containing polar group, a conjugated diene and an aromatic vinyl.

8. A rubber composition as claimed in claim 7, wherein, in the diene rubber having a heteroatom-containing polar group, the vinyl monomer having a heteroatom-containing polar group is present in a proportion of 0.01 to 20% by weight.

9. A rubber composition as claimed in claim 7, wherein the diene rubber having a heteroatom-containing polar group is a copolymer composed of 0.01 to 20% by weight of combined vinyl monomer units having a heteroatom-containing polar group, 40 to 99.99% by weight of combined conjugated diene units, and 0 to 55% by weight of combined aromatic vinyl units.

10. A rubber composition as claimed in claim 4, wherein the diene rubber having a heteroatom-containing polar group is a polar group-containing diene rubber obtained by reacting a modifying agent with a polymer of a conjugated diene which has a combined active metal in the molecule, or a copolymer of a conjugated diene and an aromatic vinyl which has a combined active metal in the molecule, and thereby introducing a polar group into the polymer or copolymer.

11. A rubber composition as claimed in claim 10, wherein the diene rubber having a heteroatom-containing polar group is a polymer or copolymer composed of 40 to 100% by weight of combined conjugated diene units and 60 to 0% by weight of combined aromatic vinyl units.

12. A rubber composition as claimed in claim 10, wherein the heteroatom-containing polar group is a hydroxyl, oxy, epoxy, carboxyl, carbonyl, oxycarbonyl, sulfide, disulfide, sulfonyl, sulfinyl, thiocarbonyl, imino, amino, nitrile, ammonium, imido, amido, hydrazo, azo or diazo group.

13. A rubber composition as claimed in claim 4, wherein the heteroatom is a nitrogen, oxygen, sulfur or phosphorus atom.

14. A rubber composition as claimed in claim 4, wherein the heteroatom-containing polar group is a hydroxyl, oxy, epoxy, sulfide, imino or amino group.

15. A rubber composition as claimed in claim 1, wherein the fatty acid metal salt is an alkali metal or alkaline earth metal salt of a fatty acid having 10 to 20 carbon atoms.

16. A rubber composition comprising 100 parts by weight of a diene rubber component, 30 to 120 parts by weight of a reinforcing agent comprising silica alone or a combination of silica and carbon black, the weight ratio of silica to carbon black being in the range of 50:50 to 90:10, and 1 to 5 parts by weight alkali metal salt or an alkaline earth metal salt of a fatty acid having 10 to 20 carbon atoms, and a silane coupling agent in an amount of 2 to 20 parts per 100 parts by weight of silica.

17. A rubber composition as claimed in claim 16, wherein the diene rubber is at least one member selected from the group consisting of natural rubber, polyisoprene rubber, polybutadiene rubber, styrene-butadiene copolymers and styrene-isoprene-butadiene terpolymers.

18. A rubber composition consisting essentially of 100 parts by weight of a diene rubber component, 30 to 120 parts by weight of a reinforcing agent comprising silica alone or a combination of silica and carbon black, the weight ratio of silica to carbon black being in the range of 50:50 to 90:10, and 1 to 5 parts by weight alkali metal salt or an alkaline earth metal salt of a fatty acid having 10 to 20 carbon atoms, and a silane coupling agent, which is a member selected from the group consisting of vinyltrichlorosilane, vinyltriethoxysilane, vinyltris-(β-methoxyethoxy)silane, β-(3,4-epoxycyclohexyl)ethyltrimethoxysilane and γ-glycidoxy-propyltrimethoxysilane, in an amount of 2 to 20 parts per 100 parts by weight of silica.

19. A rubber composition as claimed in claim 18, wherein the diene rubber is at least one member selected from the group consisting of natural rubber, polyisoprene rubber, polybutadiene rubber, styrene-butadiene copolymers and styrene-isoprene-butadiene terpolymers.

20. A process for preparing the rubber composition of claim 1 by adding silica and other ingredients to the diene rubber component and kneading, which process comprises dividing a predetermined amount of silica into two or more portions, and adding the two or more portions separately.

21. A process for preparing the rubber composition of claim 16 by adding silica and other ingredients to the diene rubber component and kneading, which process comprises dividing a predetermined amount of silica into two or more portions, and adding the two or more portions separately.

* * * * *